United States Patent
Mann

[11] 3,912,367
[45] Oct. 14, 1975

[54] OPTICAL MULTIPACTOR

[76] Inventor: Michael M. Mann, 4248 Via Alondra, Palos Verdes Estates, Calif. 90274

[22] Filed: Oct. 18, 1973

[21] Appl. No.: 407,631

[52] U.S. Cl. .................. 350/160 R; 333/99 MP
[51] Int. Cl.$^2$ .................. G02F 1/30; G02F 1/36
[58] Field of Search ............ 333/99 MP; 350/160 R

[56] References Cited
UNITED STATES PATENTS
3,433,555  3/1969  Tomlinson .................... 350/160 R OTHER PUBLICATIONS
"Microwave . . . Multipactor Discharge," Microwave Journal, Mar. 1972, C. Milazzo, pp. 93–98.

Primary Examiner—Vincent P. McGraw

[57] ABSTRACT

In a preferred embodiment, a two-electrode discharge device, or "optical multipactor," for modulation of high-power radiation beams, especially adapted for switching or attenuating laser beams; the device providing an inter-electrode gap with electron cloud oscillating thereacross, operating as secondary electron emission in resonance mode with the passing beam. This device is capable of providing much faster beam switching, wider modulation bandwidths and extremely low capacitance, such that its power requirements (for such modulation and switching of high-power beams) are greatly reduced, as is the likelihood of damage from the beam.

11 Claims, 3 Drawing Figures

OPTICAL MULTIPACTOR

BACKGROUND, FEATURES

Workers in the art of modulating (e.g. switching or attenuating) beams of high-power radiation, especially laser beams at infrared, or shorter, wave lengths, will acknowledge that the state of the present art is far from satisfactory. Various beam modulators — mechanical, acoustical, electro-optical and other types — have been tried, but they all have serious shortcomings.

A mechanical modulator of this type will comprise an element such as chopping-wheel, a shutter or a mirror, which is mechanically interposed into the optical path of the beam. Obviously, when manipulating mechanical modulator elements of finite mass, modulation speed is going to be greatly limited by inertial effects; moreover, there is going to be a definite limit on the amount of beam power which may be intercepted without serious damage to interposed elements; such devices thus have a characteristically low "power threshold."

Acoustico-optical modulators of this type have depended upon acoustically-induced changes in the (surface or bulk) properties of a beam-transmission medium to effect beam modulation. In this case, modulation speed (response) will, of course, be limited by acoustic transit time through the medium; moreover, the power threshold of such material will also be a limiting factor.

It appears that the fastest beam modulation devices in current use are electro-optical, of a type inducing changes in the refractive properties of beam-transmission material — either a solid, a liquid (Pockells Effect) or a gas (Stark Effect). However, such elements exhibit effects which seriously limit frequency response such as transit time, RC delay time and molecular reorientation time. There are also serious limitations as to maximum beam power that can be transmitted (associated with breakdown or other damage to the transmission medium).

Using microwave technology may be considered. For instance, gas TR (transmit-receive) switches seem somewhat feasible whereby electrical breakdown of a gas medium interposed in a beam path might be intentionally induced so as to reduce the intensity of the transmitted beam. Even here, however, modulation speed and response will be seriously, and inherently, limited by the time required for ionizing and/or recombining gas particles.

It is an object of the present invention to effect such beam modulation using a novel optical multipactor arrangement, alleviating, or at least eliminating, some of the foregoing problems and limitations.

The subject invention is based on a few simple principles associated with providing a pair of secondary emission surfaces across a beam-transmission gap, in a vacuum chamber, whereby, with electron emission across the gap initiated, passage of a high-power optical radiation beam exhibiting the proper driving AC field will so modulate the passage of emitted clouds of electrons across the gap as to attenuate, or even completely interrupt, the beam. Such an arrangement is characterized as an optical multipactor (providing multiple electron impact to an optical type radiation beam).

Microwave Art

It should be understood that a somewhat comparable "microwave multipactor" develops a discharge current across a prescribed microwave transmission gap so as to affect (e.g. switch) the passage of the microwave radiation through the gap. This discharge current is derived from secondary emission from a pair of plane, parallel electrodes defining the gap, to produce an electron cloud oscillated back and forth between the electrodes in a prescribed manner by an RF electric field established therebetween. Of course, this RF field will have sufficient amplitude to provide a prescribed associated electron velocity and its frequency will be properly synchronized to develop the desired transit time (given a prescribed subject gap).

Now, workers in the microwave art will recognize that the foregoing microwave multipactor effect was generally considered quite undesirable and extensive efforts exercised to avoid it. It was first noticed, apparently, in high-power klystrons and like travelling wave tubes whereby, as power increased, the effect took hold to attenuate and eventually terminate the tube output. This effect was, at first, considered quite mysterious. Tinkering with the output wave quide structure eventually relieved the effect and permitted passage of the output beam at the problematical power levels. This led to an experimental, empirical approach to controlling the multipactor effect and, in turn, led to using it as a crude switch control for microwave output. Of course, unlike the present effect, it did not concern radiation at the infrared wave lengths and below, and was necessarily associated with microwave wave guide structures.

For such a microwave multipactor discharge to be self-sustaining, the secondary emission coefficient of the electrode surfaces must be made greater than unity. Also, the magnitude and frequency of the applied RF field will preferably be adjusted so that the electron cloud traverses the gap during a half-cycle. For instance, assume an electron is accelerated to leave the emission surface of the first electrode at the beginning of an RF cycle, travelling across the gap toward the opposite second electrode surface. Given proper gap spacing and RF voltage amplitude, it will arrive at that second surface just in time for the field to be reversing — whereupon its impact will generate secondary electrons there. These will immediately be accelerated back towards the first surface during the next half-cycle of the AC field. These secondary electrons will, in turn, arrive back at the first surface just in time to generate secondary electrons which begin a return trip just as the next RF cycle is beginning — and so on.

Thus, the electron cloud is reformed by secondary electrons generated each time the cloud strikes an electrode surface; and electron transit times are synchronous with applied voltage. In the simplest case, electron transit time is one-half an RF cycle, but many other modes are possible, transit time being an odd multiple of half-cycles.

As electron density increases, however, mutual repulsion will cause some of the electrons to fall "out of step" with the field and thus will limit the maximum electron density to a value controlled by the secondary emission coefficient. A steady-state (or saturation) current is then reached when electron losses, resulting from such "space-charge debunching" effects, balance the gains resulting from secondary yield.

The theoretical "recovery time" (time required for discharge current to drop to zero) is on the order of one-half a cycle. Note that, in this vacuum, there are no residual ions requiring recombination, and hence no gas de-ionization delay is involved. In practice, the recovery time is likely to be determined by the "ringing time" of the associated circuit (if it is "resonant," though such need not be the case).

Thus, for a multipactor discharge to be self-sustaining in that preferred fundamental mode, it is necessary that: (1) the electron transit time be one-half the RF period; and (2) the velocity of electron impact correspond to the "range" in which the secondary emission coefficient is greater than unity. The net result is to establish "multipactor action"; that is, electron multiplication between a pair of secondary electron-emissive surfaces by means of a time-synchronous alternating electric field.

To terminate or quench this discharge, a DC voltage is applied to the multipactor region so as to alter the synchronous transit condition. Such a quenching DC voltage can control whether the device functions in a passive (transmission) mode or in an active (reflecting) mode.

Thus, it is an object of the subject invention to meet at least some of the problems and needs mentioned above in a novel "optical multipactor" arrangement for modulating optical beam radiation. A more specific object is to so modulate radiation in the IR wave length or shorter by directing it past a pair of opposed electron secondary emissive surfaces separated by a prescribed vacuum gap under "beam-matching" (resonance) conditions. It is a further object to so provide a radiation beam through such a multipactor gap as an alternating-frequency beam, polarized normal to the emissive surfaces, with the intermediate gap being such as to accelerate electrons between the surfaces under "resonant beam" conditions. A more particular object is to provide such beam modulation (attenuation) wherein the gap is so arranged relative to the subject beam as to provide electron transit time comprising an odd multiple of beam vibration half-periods. A further object is to provide such an arrangement with DC quenching means.

A further object is to provide such an IR beam switching means together with DC quenching means, and/or to provide such an arrangement, including a pair of spaced emissive electrodes coupled in isolated fashion with the DC potential quenching means. A further object is to provide such an arrangement in an evacuated chamber including entry and exit portions relatively transparent to the radiation, together with associated beam focusing and output manipulating means. A further object is to provide such an arrangement, together with electron emission initiating means such as a source of Beta radiation or the like directed at least a portion of the emissive surfaces in the gap — particularly for beam switching.

A more particular object is to provide such an arrangement having a prescribed radiation with a relatively high number of vibration modes and associated, conforming gap dimensions. A related object is to provide a like arrangement wherein the electron transit time across the gap is one-half the period of radiation vibration. A related object is to provide such an arrangement where the length of the gap and/or the number of such optical multipactor gaps are provided according to the degree of attenuation desired.

A further object is to provide such an arrangement in the form simply of a conductive cylindrical electrode having secondary emissive material around the circumference thereof along at least a portion of its length.

Another object is to provide such an arrangement wherein electron conservation means are provided to minimize leakage from the gap area. A related object is to provide such an arrangement where during a period of beam processing an external source of electrons is continually supplied to compensate for such electron leakage.

A more particular object is to provide such an arrangement as adapted for the heating and/or triggering of a target means including heated charged particles in a plasma or the like adapted to be heated selectively by application of laser beam radiation, the optical multipactor being interposed as a switch isolating this laser beam from the said target with no significant "reflection radiation" being presented back to the laser source.

Other objects and associated advantages and features will be apparent from consideration of the following description of preferred embodiments of the invention, together with the associated drawings wherein.

OPTICAL MULTIPACTOR

The present invention will be seen as similar, though distinguishable from such known microwave multipactors in terms of both its structure and its operation — being characterized as an optical multipactor.

GENERAL

Figure 1:
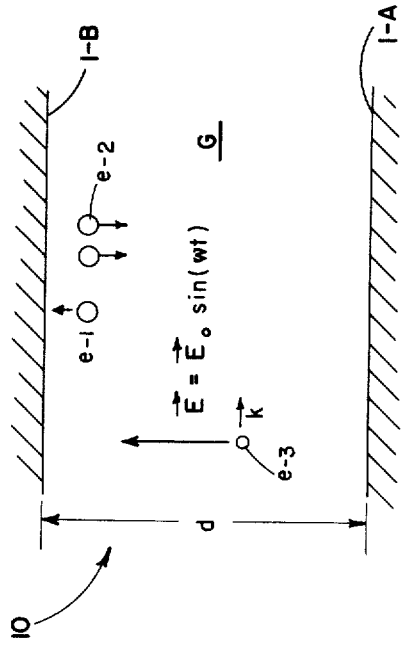
FIG. 1 is a highly schematized sectional view of an optical multipactor gap, diagrammatically illustrating certain electronic effects.

Referring now to FIG. 1, a generalized description of the materials, techniques and phenomena associated with the invention is given, preliminary to understanding the details of the specific embodiment, described below. In FIG. 1, a pair of plane (preferably parallel) electron emitting surfaces 1-A, 1-B are indicated, being separated by a precise, constant gap spacing $d$, the confines of this gap being kept in a (relatively hard) vacuum atmosphere G, and, as described below, adapted to operate as an optical multipactor switch 10. It will be understood that the subject beam (to be processed) exhibits an alternating electric field E extending between surfaces 1-A, 1-B, these surfaces comprising emissive material exhibiting secondary emission ratios somewhat in excess of 1. Field E will be understood as polarized relatively normal to these emissive surfaces and to exhibit sufficient amplitude to accelerate free electrons (such as electron $e$-3) across gap $d$. The relationship of gap (distance) $d$ and field E is such as to establish an electron transit time (between surfaces 1-A, 1-B) approximately equal to an odd multiple of a half-period (synchronized with the frequency of field E). Thus, electrons like $e$-3 are assumed to be ejected from emitter 1-A, to be accelerated to impact emitter 1-B and produce secondary emission, back across gap $d$ toward surface 1-A (as electrons $e$-2), experiencing a similar synchronous acceleration there. A secondary multipactor discharge will thus occur here, under such beam matching conditions.

The magnitude of the discharge current so produced is presumably limited primarily by space charge effects; by debunching, dephasing and surface heating. The absorption and reflection of an incident beam wave will effectively limit the power that is transmitted (output power from switch 10) as a result of this multipactor effect.

By applying a DC bias across gap d, this discharge (electron transit resonance) may be disrupted and the transmission attenuation terminated. Beam switching may obviously be effected in this way. Such a device may also be used as a limiter or a high-speed optical beam switch or as a modulator (attenuation incomplete).

Switching speed can, of course, be quite high (on the order of a few optical periods — nano seconds), with quite low capacitance. Such switching through a "vacuum medium" avoids the complications of transmitting through a material medium or matching thereto, as well as the possible damage from high beam intensity (e.g. laser) radiation.

Theory

Now, if it is assumed that the electric field E of the subject beam is defined as:

$$E = E_0 \sin \omega t,$$

where
$E_0$ = ref. field amplitude
$\omega$ = angular frequency, it may be shown that gap d can be defined in terms of beam vibration mode as a function of electron gap-transit time $t$, where $t$ is an odd multiple of half-periods $$t = (2N-1) \frac{\pi}{\omega} :$$

$$d = \frac{e}{m} \frac{E_q}{\omega^2} (2N-1) \pi$$

where $e$ and $m$ represent the charge and mass of the electron, respectively, and $N$ represents the number of periods.

The threshold, or maximum, power $P_t$ carried by this switch for an $N^{th}$ mode may be computed as follows: Assuming a prescribed effective beam area $A$ ($A \approx d^2$), and a gap $d$ roughly ten times the beam wave length ($d = 10\lambda$), threshold power (in watts) would be:

$$P_t = \frac{10^{15}}{(2N-1)^2}.$$

It can also be shown that for $d = 10\lambda$, the electron impact energy $U$ may be represented as a function of mode:

$$U = \frac{4 \times 10^6}{(2N-1)^2}.$$

Now, regarding secondary emission yield, at impact energies from 500 to 1,500 volts, it will be seen that $$P_t \approx 10^9 \text{ (watts)}.$$

As may be apparent from the foregoing, the optical multipactor according to the invention will necessarily be operated in a "high N" mode (that is, a considerable number of periods; on the order of several dozen or more) to achieve significant advantage in switching or modulation applications.

It is interesting to compare the subject optical multipactor with the aforementioned microwave multipactor; this optical multipactor is much less area-dependent and may advantageously be operated with much smaller electrode areas and much shorter wave lengths (beam radiation). For instance, in a microwave embodiment, the capacitance generator C is obviously a function of a medium transmissivity $E$, and electrode area $A$, as well as an inverse function of gap distance $d$:

$$D = \frac{EA}{d}$$

and, accordingly, microwave multipactors have been made relatively long to produce the high area necessary to, in turn, raise capacitance to a proper level; thus, dissipating all too much power in switching high-frequency microwave radiation. Also, such microwave switches are relatively ineffective at shorter waave lengths (e.g. IR and shorter — unlike the invention) because of the high density, high transmissivity media they tend to function in (not being evacuated) — this can lead to inordinate power dissipation — as area A increases, power rises as the cube of the wave length ($\lambda^3$). Obviously, this optical multipactor will be relatively free of such limitations and so be well able to operate with high frequency (short wave length) radiation, such as with IR and like laser output beams.

Figure 3:
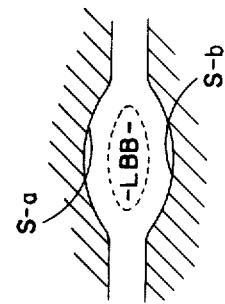
FIG. 3 is a very schematic and sectional view of a laser beam in a gap similar to the foregoing embodiment, but modified somewhat.

The effectiveness of such a multipactor switch is also limited by the loss of electrons from the gap — for instance, space charge repulsion effects will always eject some electrons from the gap and make them unavailable for secondary (and subsequent) emission — this must either be minimized or compensated for. That is, by increasing the secondary emission characteristics, to constantly replenish the electron supply (such as with a radioactive Beta source) compensation is possible. Alternatively, one may minimize this "sidewise" electron loss, such as by adding a containing magnetic field (not described, but understood in the art). Other limitations result from the space charge that builds up near the emitter surface — such as electron debunching and electron dephasing, as understood in the art and mentioned elsewhere, as well. One particular troublesome problem resulting from this space charge is a variation in the "effective gap" dimension (either across the tube or down its length) whereby space charge builds up differentially (in different thicknesses of electron clouds, adjacent one or both the secondary emission surfaces), to produce different fields, and consequently different phase changes, for an electron cloud passing therethrough (See FIG. 3 description).

Such a space charge cloud can obviously be quite important and, indeed, multipactor effects are strongly dependent upon the beam radiation mode numbers. That is, as the field tends to build up, electron clouds flashing across the gap will tend to build up a greater and greater space cloud. This can cause secondary electron emission sources, such as from thermionic electron emission (from impact on the emission surfaces) to re-radiate photons and result in (real, or reactive) electron losses. Accordingly, this cloud will tend to change the index of refraction of the effective medium in the gap and result in reflection of the radiation beam passing therethrough. It will be apparent that the beam radiation mode will affect or influence the number of electron clouds so generated and oscillating, and the higher the mode number, the more laminar electron clouds there will be and the more inter-cloud interference there will be.

Of course, for most practical applications, it will be apparent that this electron emission is preferably intitiated by an external auxiliary electron source, such as active Beta source 26 in the embodiment of FIG. 2, described below. This source may supply electrons initially; then, under the influence of the vibrating electron field of the passing beam, secondary emitted electrons will be swept across the gap, impacted against an opposing surface and cause an increasing secondary emission electron population, etc., until an "equilibrium emission" condition is achieved — hereinafter called "beam resonance." Then, attenuation or switching effect of the beam may be invoked and used until the emission is quenched (by DC voltage, as noted below).

Alternatively, and especially to compensate the electron losses, as noted above, the external auxiliary supply of electrons may be continually operative to supplement the supply of electrons from secondary emission in the gap.

A preferred embodiment of the subject optical multipactor device will now be described.

PREFERRED EMBODIMENT

Figure 2:
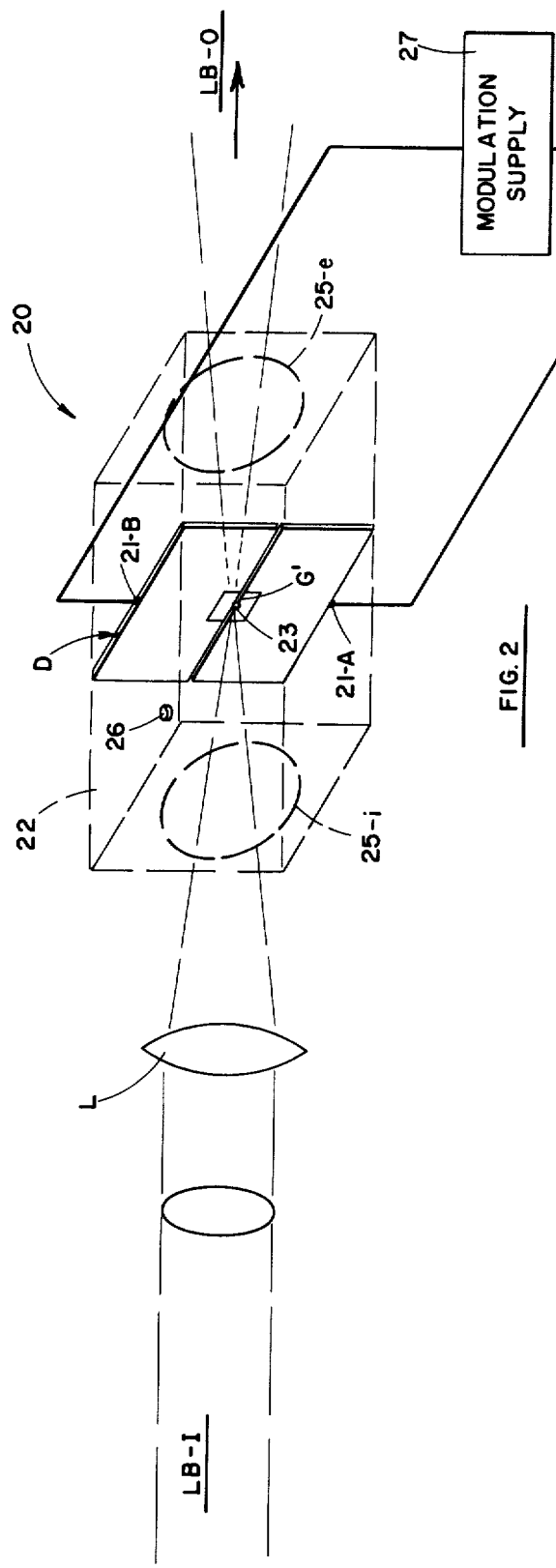
FIG. 2 is a very schematic perspective view of an optical multipactor switch arrangement adapted to selectively attenuate a passing laser beam.

A preferred embodiment of the subject invention is shown in FIG. 2, and its operation illustrated and described below, somewhat idealized — with incidental reference to FIG. 1, as well, this embodiment being like that of FIG. 1 except where otherwise stated. Here, an optical multipactor switch embodiment 20 is shown (FIG. 2) comprising, essentially, an evacuated chamber 22, including a pair of input and output compartments shown defined and separated by a medial multipactor discharge array D. A prescribed optical radiation beam is adapted to traverse chamber 22, entering and exiting through transparent apertures 25, while passing through the gap of multipactor D for selective processing thereby.

Discharge array D, in turn, comprises a pair of spaced upper and lower electrodes 21-B, 21-A, respectively, sseparated by a prescribed uniform gap distance $d-d$, which, as described above, is preferably prescribed according to the radiation wave length and vibration mode of expected beam LB.

Speaking generally, it will be apparent that an entry optical radiation beam LB-I (e.g. laser vibration in a prescribed mode, at an IR wave length) is focused, such as by focusing lens system L, to converge upon the central portion of gap $d-d$ (working gap area G', the multipactor discharge region), passing through transmissive window 25-i. After traversing working gap G', the beam will be affected by the prescribed multipactor effect, such as being switched "off" for a selected, controlled time, to be transmitted as output beam LB-o, passing through exit transmissive window 25-e.

Switch array 20 will, of course, include a termination control, preferably in the form of modulation voltage supply 27 adapted, for instance, to apply a prescribed DC voltage across gap d-d, between electrode plates 21-B, 21-A, which is sufficient to disrupt the multipactor discharge and terminate the effect upon the passing beam LB (e.g. re-open the switch, allowing beam LB to pass out window 25-e unaffected during the prescribed "off" time).

Turning more particularly to the details of the switch 20, and electrodes 21 especially, it will be apparent that, at least in the multipactor discharge region G', the confronting electrode surfaces will comprise secondary emission material 23 adapted to exhibit "1 + emission," under the contemplated resonant beam conditions in this embodiment. Thus, these electrode faces will preferably comprise a secondary emission material having emissivity greater than 1 as well as appropriate electron range, etc., as known in the art. A preferred material for embodiments like this is a silver-magnesium alloy. Alternatively, nickel-barium, or copper-magnesium will be appropriate, as will other semimetal oxides and related materials having good thermal properties (e.g. not vaporizing during the prescribed use), as well as high secondary yield and relatively low electron energies (good "EPM"). As workers in the art know, secondary emissive material has a higher yield if it is slightly oxidized.

As mentioned below, alternative electron emission mechanisms will be feasible in certain instances as those skilled in the art can contemplate. For instance, electrons may be continually supplied by a radioactive-isotope source (such as a Beta emitter), by a thermionic emitter or by an electron gun (for such alternative means it will be important to get the electron supply flowing without "jitter").

The optical beam transmission and focusing means will be relatively conventional, for instance, with laser beam radiation in the ten micron region, sodium chloride lens and window material will be suitable as well known in the art; for the visible wave lengths, quartz or the like would be apt.

The use of the foregoing electrodes and the electron impact associated with such discharge, especially under a high duty cycle, may well produce high electrode temperatures that might tend to vaporize the emissive material unless proper cooling is provided, as understood by those skilled in the art (it might even induce thermionic emission which could be helpful up to a point). Thus, a water-cooled jacket, or like cooling arrangement, will be supplied to maintain a reasonable maximum temperature for the electrodes.

OPERATION

The operation of switch 20 according to the invention will be more aprent and better understood from the following description of its use in a particular way with a particular high-intensity optical beam, namely, laser beam LB, with the elements of switch 20 particularly adapted to modulate beam LB, that is, partially or fully attenuate its intensity as it traverses the discharge gap G'. Here, the entry laser beam LB-i will be understood as emanating from a (CW or pulsed) source of laser radiation, in the IR wave length or shorter — preferably from a coherent source like a carbon dioxide laser putting out 10 micron radiation at approximately 100 kw or less power. A beam of relatively narrow cross section is formed and focused to traverse the gap G' with its IR radiation exhibiting an electric field of a few kv peak, according to the mode number. Beam power will depend upon the mode; as the mode number increases, the space charge will decrease, thus, a longer wave length will result corresponding to a lower power beam.

Once this optical multipactor array D is fully operational, the passing laser beam LB will, of course, be understood to be attenuated (here, fully interrupted and cut-off) so that nothing will emanate from exit window 25-e (zero power exit beam LB-o)— these interruptions being timed, for instance, for purposes of signal encoding or the like.

This operative condition will preferably be initiated by direction of electrons from Beta source 26 toward one or both of the emissive surfaces in gap G' (surfaces 23 of electrodes 1-A, 1-B in FIG. 1), whereupon the secondary electron emission described will begin and build to a maximum. This will give rise to a plurality of electron clouds which will oscillate back and forth across gap G' under these beam resonance conditions to perform the contemplated switching attenuation. That is, the alternating electric field exhibited by the passing laser beam traversing gap G' will be polarized normal to these emission surfaces and be sufficient to accelerate free electrons thereacross, in a transit time approximately equal to an odd multiple of a half vibration period of beam radiation. As described, this will be seen to cause this electron cloud oscillation and, with secondary emission yield exceeding electron loss (as workers in the art will understand from the foregoing), a secondary electron resonance or optical multipactor discharge condition will be created. This effect will serve to so absorb and reflect beam LB-i as to attenuate and limit beam power to the prescribed degree. This will build cumulatively as the beam proceeds down the length of gap G (along beam axis); thus, the longer the gap, the more attenuation experienced. Of course, as seen below, a plurality of such multipactor devices can be ganged together in series to increase the attenuation (or other effects) to the desired degree.

At a point in time after onset of this described attenuation effect — comparable to the time for the full contemplated attenuation to have been achieved (beam treatment time) — this multipactor effect will be terminated and the beam thereafter left to pass unaffected. This termination is effected by application of the DC field from supply stage 27, as described above.

That is, a proper DC voltage is applied from modulation supply 27 across the multipactor electrodes 21 and gap G' so as to interrupt the synchronous electron transit, and so disrupt and quench the multipactor condition. This will terminate all associated modulation and allow beam LB to pass through gap G' unaffected thereafter. Thus, application of the DC bias "opens" the multipactor switch D to be 100 percent transmissive — the transmissivity or the "on," or active, condition of switch 20 (fraction of beam energy transmitted thereby) being a function of the amount of absorption and reflection of the incident beam affected by the oscillating electron clouds.

This DC bias is preferably supplied from bias supply 27 adapted for the particular effect described here, preferably applying a few kv-DC — as high as possible consistent with no arc across G'. By contrast, during the "on" period, the field across the gap will be relatively neutral except for the effects of the passing radiation beam field and the multipactor electron clouds.

This applied DC bias will either be continually applied to maintain switch 20 "off" and bar any further secondary emission (e.g. if Beta source 26 is continually operative); until the next "on" time. Alternatively, other "hold-off" means, such as for interrupting the initial emission, can be provided.

Such a DC bias control will be understood to switch the multipactor mode "on" and "off" very, very quickly; for instance, at a rate of 10 times the beam frequency (or about $10^{11}$ cps here; corresponding to a switching time on the order of 10 pico-seconds), with very short "rise time" for the switch (on the order of nanoseconds here); something very valuable in the art. Good "on/off" beam power contrast is thus also feasible (e.g. on the order of about 10 dB signal/noise ratio). When using the multipactor for beam switching, an isolating coupling to one of the electrodes 21 is necessary (although, when using it as a Limiter, this will not be necessary as known in the art).

CONCLUSION

Accordingly, as workers in the art can well appreciate, such optical multipactor devices may be used not only as ultrafast switches for modulating (controlled attenuation) such high-intensity optical beams, but may also be used as beam limiters and the like. Workers will further appreciate the many advantages derived over conventional comparable devices, especially in speed of operation, in the vacuum operation facilitated (not requiring that optical beams be transmitted through any material medium that might be affected by beam power or disrupt beam characteristics, however high the beam intensity). Of course, such devices will be ultimately limited by such factors as heat (electron impact-heating, etc.); however, with proper engineering and design, this capability can be optimized.

Also, as suggested above, a plurality of such multipactor devices may be ganged in series to operate a plurality of times on a single passing radiation beam — being increasingly efficient for each successive multipactor stage, of course, with beam power being reduced (gap distance may also be progressively reduced, etc). Further, when such a device is used as a limiter (to attenuate beam intensity in a controlled manner), it may, in certain instances, comprise simply a cylindrical tube with a cross section that approximately matches and surrounds that of the beam (centered therealong); with secondary emission preferably emanating 360° around the inside of the tube performing the attenuation effect — this operating much in the manner of a "negative saturable absorber." For such a "limiter," as the length of such tube is extended, the electron beam would become weaker and weaker, and attenuation become easier and undesired transmission less likely (the opposite of conventional devices, today).

Moreover, the present device is not only simple, but quite compact. For instance, a laser beam diameter on the order of 15 microns may be used with multipactor electrodes whose area A is on the order of 100 microns$^2$ and whose gap distance d is on the order of 1,000 microns.

Of course, the emissive electrode surfaces need not be parallel in all cases, especially when used with a cross-sectionally circular beam. Ideally, they would tend to assume the same outer shape as the beam, both laterally and longitudinally, as it proceeds down the gap. Moreover, the gap may be constricted, to become smaller and smaller, consonant with decreasing cross-sectional size of the beam. One advantage of this electrode-beam matching will be to reduce any variation in transit time across the gap by virtue of differential absorption of the electrons — where beam cross sections of different thickness lie at different points across the gap. Workers in the art will visualize many alternative modes of implementing this concept.

Also, one might use a single multipactor gap for a plurality of laser beams; similarly, one might provide a substituted, or auxiliary, source of electrons for the described electron clouds, such as a continually-replenished source of Beta rays (electrons) or alpha particles (Helium nuclei) or the like. Preferably such will be provided with electromagnetic focusing means around the gap to minimize the leakage of electrons or other charged particles therefrom.

Furthermore, workers in this art will recognize that the subject concept of optical multipactor switching can provide new and improved modulator devices for switching, attenuation and the like of high-intensity optical beams, like high-power IR laser beams — and that this may be particularly valuable in resolving the difficult isolation and pulse selection problems associated with laser induction of fusion or other charged particle heating environments (e.g. the modulation means being isolated from a particular target, allowing the pulsed beam to hit the target and not be reflected back toward its source, etc.). Other, equally valuable advantages will be seen to derive in the communications field, such as high-speed switching capabilities with high-power laser beams.

Moreover, as mentioned above, an optical multipactor gap, such as that shown in FIG. 1 and discussed above, need not comprise a pair of flat, parallel, opposed electrode-emission surfaces, but may be modified to conform more closely to the cross-sectional configuration of the passing laser beam. Such is indicated very schematically in FIG. 3 for laser beam LBB, the relatively-elliptical cross section of which will be understood as to be effected in the foregoing manner by a pair of opposed, upper and lower, emissive surfaces (S-a, S-b, respectively) constituting the working optical multipactor gap, being more closely conformed to the beam cross section. These will be understood as compensating for the aforediscussed variation in electron transit time across the varying beam cross section (produced by variation in resultant overall field upon the differentially-located electron transit paths). Of course, workers in the art will readily be able to visualize other similar expedients effecting the same result for such a radiation beam; as well as visualizing other different, but analogous, beam cross sections having similar, conforming gap electrodes.

While this invention has been particularly described and illustrated herein with reference to its use in and for a particular arrangement of electrodes and associated fields and for a particular kind of beam radiation, it will be clear that the subject features and techniques can be advantageously employed, individually or cumulatively in combination, with other related equipment and for analogous purposes. Obviously, equivalent parts and materials and techniques may be employed, separately or cumulatively, within the spirit and scope of the invention as defined in the appended claims.

What is claimed is:

1. An optical multipactor system comprising at least one pair of opposed conducting surfaces coated with secondary emissive material and separated by a prescribed gap distance, this gap being arranged to be kept at a relatively high vacuum; means for maintaining the gap region substantially evacuated; a source of light energy; means for focusing said light energy through said gap, the level and vibration mode of said energy being sufficient to induce an optical multipactor discharge in said gap; and discharge terminating means connected between said surfaces for selectively terminating said discharge, wherein said light energy is provided at infrared wave lengths or shorter and disposed to be polarized normal to said emissive surfaces and adapted to oscillate electron clouds between said surfaces in a prescribed synchronous manner whereby the transit time therefor is on the order of one-half a radiation vibration period.

2. The system as recited in claim 1 wherein said emissive surfaces comprise material having an emissivity greater than unity and adapted to be thermally compatible with the said multipactor operation and not vaporize during this operation.

3. The system as described in claim 1 wherein said termination means comprises a source of high DC voltage but below that level tending to cause an arc across said gap.

4. The combination as recited in claim 3 wherein said emissive material comprises silver-magnesium or the like.

5. The combination as recited in claim 1 wherein it is also provided emission starter means adapted to selectively initiate secondary emission from at least one of said surfaces.

6. The combination as recited in claim 5 wherein said starter means is arranged to be controlled so as to selectively initiate the prescribed beam attenuation action.

7. The combination as recited in claim 1 wherein is provided anti-leakage means surrounding said gap and adapted to minimize the leakage of electrons therefrom.

8. The combination as recited in claim 1 wherein said gap is adapted to have a length sufficient to provide the prescribed degree of beam attenuation.

9. In a device using multipactor discharge, at least one pair of opposed emissive electrode surfaces defining a multipactor gap region having a prescribed gap distance therebetween, confronting portions of the electrode surfaces having emissive material thereon with a secondary emission coefficient greater than unity; an electromagnetic energy source for generating a high-intensity radiation beam at infra-red or shorter wave length; means for focusing the beam through this multipactor region; said beam being selected and provided so as to exhibit an alternating electric field in the multipactor region whereby electrons will be alternately attracted to one electrode surface and then to its opposite producing secondary electron emission there in synchronism with the beam field; and quenching means for disrupting this electron emission and so terminating the associated multipactor discharge, and thereby, the beam treatment.

10. The combination as recited in claim 9 wherein said quenching means comprises a source of high DC biasing voltage applied to said electrodes to prevent the emitted electrons in the multipactor region from traversing the gap, to thereby either prevent formation of a multipactor discharge or else quench an existing multipactor discharge.

11. A method of selectively treating an optical beam directed along a prescribed treatment path by terminating or otherwise attenuating it, this method comprising:

focusing said beam between at least one pair of opposed electrode surfaces provided with secondary emissive material, said material being elected and disposed such as to emit increasing secondary electrons as an alternating discharge between the surfaces in synchronism with the beam and so effect said treatment as matched to the vibration characteristics of the subject beam, these surfaces extending far enough along said path to effect the contemplated degree of treatment; evacuating the region between said surfaces; introducing the subject beam along said path, while initiating said emission and allowing it to continue until said treatment is accomplished; and then terminating this discharge.

* * * * *